June 16, 1959 P. W. SPALDING 2,890,510
FISHLINE ATTACHMENT
Filed Oct. 10, 1955

*INVENTOR:*
PALMER W. SPALDING
BY
Marzall, Johnston, Cook & Root
ATT'YS

United States Patent Office  2,890,510
Patented June 16, 1959

2,890,510

FISHLINE ATTACHMENT

Palmer W. Spalding, Chicago, Ill.

Application October 10, 1955, Serial No. 539,564

2 Claims. (Cl. 24—126)

This invention relates in general to an attachment or coupling to fasten a line to a device. More specifically, the invention relates to a coupling for a fishline to connect the line to a leader or snell extending from a fishhook.

The invention comprises, in general, a two-part coupling member in the form of an inner cone and an outer frusto-conical shaped hollow member. A line such as a fishline is threaded through the two members to form a loop extending from the coupling, the loop being used to secure a device thereto, such as threading the line through an eye formed on the snell or leader extending from the fishhook. The inner cone member may be solid, while the outer member is hollow. The line is looped as the free end of the line is returned between the solid and hollow members, whereupon the line passes between the two members, there being a loop extending outwardly of the coupling with the free end of the line returning inwardly in substantial parallelism with the main part of the line, but held between the inner and outer members. The outer member is provided with corrugations or serrations of effect a roughened surface to make a tight grip between the two members. The inner solid cone is provided with spaced recesses at its enlarged outer end to receive and guide the line.

The primary object of the present invention is the provision of new and novel means for securing a device easily and quickly to the line, or to release the line from the device, without the use of tools.

Another object consists in the provision of a securement device in the nature of an outer hollow cone-shaped member and an inner solid cone-shaped member, whereby the line is adapted to be gripped therebetween, whereupon any pulling or stress on the line, such as by hooking a fish, will cause the inner and outer members to become gripped more firmly.

Numerous other objects and advantages will be apparent throughout the specification which is to follow.

The accompanying drawings illustrate a selected embodiment of the invention, and the views therein are as follows.

Figure 1:
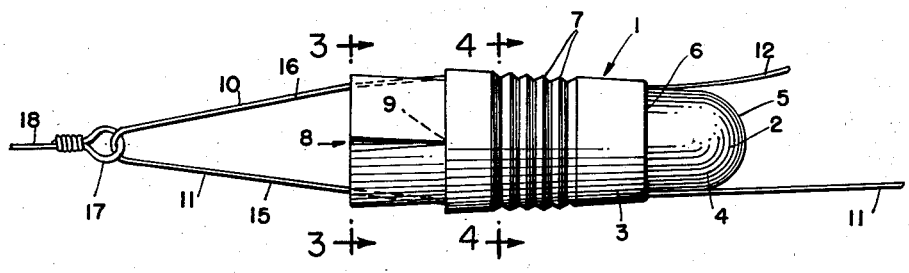
Fig. 1 is a detail elevation view of the new coupling or attachment embodying the invention, and having the fishline secured to the snell or leader of the hook.

The particular construction herein shown for the purpose of illustrating the invention comprises an attachment, securement or coupling member 1, which includes an inner cone-shaped body member 2, and a cooperating frusto-conical shaped hollow outer member or shell 3. The members 2 and 3 may be made of plastic, or any other suitable material capable of performing the function intended. The inner cone 2 is preferably made solid and includes an elongated body 4 having a line such as a tapered or rounded inner end 5 which protrudes a predetermined distance beyond the inner outside end 6 of the outer hollow member 3.

The exterior diameter of the inner member 2 is such that it is adapted to fit snugly within the outer hollow member 3 when the member 3 is slidably and shiftably mounted on the inner member 2. The outer member 3 tapers or flares outwardly, as does the inner member 2, so that when the two members are brought into juxtaposition for gripping a fishline therebetween, the outer member 3 will fit tightly and snugly about the inner member 2, as clearly shown in Fig. 2. The outer member 3 may be provided with corrugations 7 extending concentrically about the member 3 to form continuously spaced hills and valleys to form a rough inside surface for line gripping surfaces. This latter surface may comprise serrations or any other means to provide a roughened surface.

Figure 2:
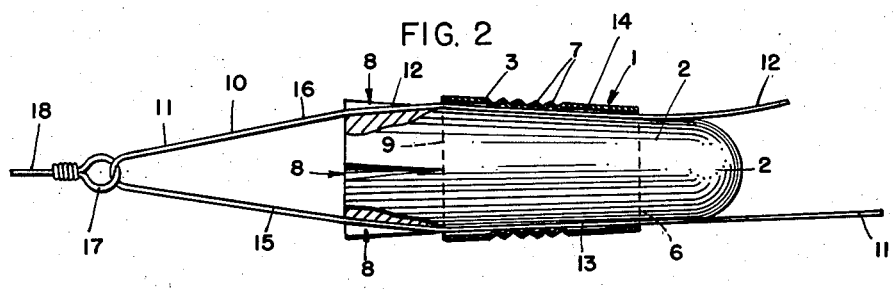
Fig. 2 is a detail longitudinal sectional view on the line 2—2 of Fig. 3.
Figure 3:
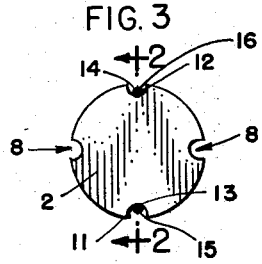
Fig. 3 is a detail transverse sectional view on the line 3—3 of Fig. 1.
Figure 4:
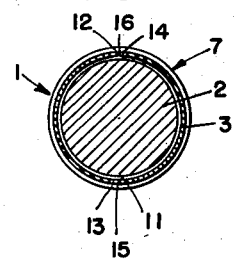
Fig. 4 is a detail transverse sectional view on the line 4—4 of Fig. 1.

The forward outer end of the inner member 2 is provided with V-shaped notches 8, which are progressively reduced in width and depth from the forward outer end and inwardly thereof, terminating at the point indicated at 9, Figs. 1 and 2.

There may be several of these V-shaped notches or grooves 8, there being four specifically shown. These notches or grooves are adapted to receive the looped end 10 of a fishline 11. The fishline 11 is attached to a fishing reel (not shown), and passes along the fishing rod (not shown), through the guides thereof. The line is then threaded between the outer member 3 and the inner member 2 and forms the loop 10, as shown in Figs. 1 and 2. The free end 12 of the line 11 is returned back reversely along the outside of the inner body 2 and lies along the inside of the outer body 3. The outer member 3 is forced to clamping position by shifting the same manually to the left, Fig. 2, whereupon the part or length 13 of the line 11, between the members 2 and 3, will be clamped. Also, the part or length 14 of the free end 12 of the line 11 also will be clamped together. The two reaches 15 and 16 of the line 11 and the free end 12 of the line, respectively, which form the loop 10, is received in opposed grooves spaced substantially one hundred eighty degrees apart.

The formed loop 10 is connected to the eye 17 of the leader or snell 18 leading to the fishhook (not shown), the free end 12 being threaded through the eye 17 to make the connection between the hook and the line.

In assembling the device and connecting the hook, the line 11 has its free end 12 inserted within the shell or outer member 3 and then threaded through the eye 17, there being sufficient line left to form the loop 10. The free end 12 is then returned inwardly through the shell member 3 and received between the two parts of the body, as shown in Figs. 1 and 2. The inner cone 2 is then pressed into the shell so that the parts or lengths 13 and 14 of the line will be clamped and tightly gripped therebetween, and the eye 17 will have the line threaded therethrough.

The invention provides a small, lightweight, positive gripping device for securing a fishline to the snell or leader of the hook. The hooks may thus be easily removed and other hooks replaced by merely pulling the shell outwardly off of the inner body 2 (to the left, Figs. 1 and 2).

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. An attachment for lines to be attached to a device comprising an inner cone-shaped substantially smooth surfaced member and an outer hollow frusto-conical shaped member adapted to be slidably and frictionally applied over the inner member and removable therefrom, the diameter of the two members being such as to frictionally impinge a line between the two members when the inner member is applied over the outer member and pressed thereon, the length of the outer member being less than the length of the inner member, the outer member being provided with circumferential projections at least on the inner surface thereof to provide a rough surface for line gripping purposes, the outer end of the inner member projecting outwardly from the forward end of the hollow outer member, said inner member being provided with longitudinal grooves spaced circumferentially apart at the outer periphery of the inner member, said grooves decreasing in depth from the forward end toward the other end thereof, said grooves terminating substantially at a point spaced slightly inwardly from the larger end of the inner member.

2. An attachment for detachably connecting a line to a device, wherein a loop may be fashioned in the line and held by said attachment for engaging the device, said attachment comprising, and an inner cone-shaped member and an outer frusto-conically shaped member adapted to be slidably and frictionally telescoped together, the diameter of said members being such as to grip a line therebetween when in assembled relation, the length of said outer member being less than said inner member, said inner member being provided with longitudinal grooves spaced circumferentially apart at the outer periphery of the inner member, said grooves decreasing in depth from the forward end thereof, said grooves terminating substantially at a point spaced slightly inwardly from the larger end of the inner member.

References Cited in the file of this patent

UNITED STATES PATENTS

| | | |
|---|---|---|
| 295,194 | Pitney | Mar. 18, 1884 |
| 1,023,706 | Anderson | Apr. 16, 1912 |
| 1,462,406 | Zajic | July 17, 1923 |
| 1,543,491 | Beghetti | June 23, 1925 |
| 1,632,502 | Peckham | June 14, 1927 |
| 2,068,368 | Bouvier | Jan. 19, 1937 |
| 2,237,618 | Weatherford | Apr. 8, 1941 |

FOREIGN PATENTS

| | | |
|---|---|---|
| 20,501 | France | May 8, 1918 |
| 28,348 | Sweden | Mar. 22, 1909 |
| 59,008 | Austria | May 10, 1913 |
| 1,087,448 | France | Feb. 23, 1955 |